(12) United States Patent
Lee et al.

(10) Patent No.: US 12,505,750 B2
(45) Date of Patent: Dec. 23, 2025

(54) CONTRAIL SUPPRESSION

(71) Applicants: AIRBUS OPERATIONS LIMITED, Bristol (GB); AIRBUS DEFENCE AND SPACE LIMITED, Stevenage (GB)

(72) Inventors: Martin Lee, Bristol (GB); Anthony Denniss, Bristol (GB); Matthew Stuttard, Bristol (GB); Martin Agnew, Bristol (GB)

(73) Assignees: AIRBUS OPERATIONS LIMITED, Bristol (GB); AIRBUS DEFENCE AND SPACE LIMITED, Stevenage (GB)

( * ) Notice: Subject to any disclaimer, the term of this patent is extended or adjusted under 35 U.S.C. 154(b) by 87 days.

(21) Appl. No.: 18/428,815

(22) Filed: Jan. 31, 2024

(65) Prior Publication Data

US 2024/0257653 A1    Aug. 1, 2024

(30) Foreign Application Priority Data

Feb. 1, 2023 (GB) ..................... 2301420

(51) Int. Cl.
*G08G 5/50* (2025.01)
*G08G 5/55* (2025.01)

(52) U.S. Cl.
CPC .............. *G08G 5/50* (2025.01); *G08G 5/55* (2025.01)

(58) Field of Classification Search
CPC .. G08G 5/50; G08G 5/55; G08G 5/76; G08G 5/34; G08G 5/53; G08G 5/21; G08G 5/25; G08G 5/32; B64D 37/30; B64D 47/00; B64D 45/00; B64D 37/00; B64D 37/32; B64F 5/00; F02C 9/40; F02C 9/26; B64C 19/00
See application file for complete search history.

(56) References Cited

U.S. PATENT DOCUMENTS

| | | |
|---|---|---|
| 9,399,521 B2 | 7/2016 | Swann |
| 9,650,968 B2 | 5/2017 | Swann |
| 9,824,593 B1 | 11/2017 | Kronfeld et al. |
| 2016/0146117 A1 | 5/2016 | Swann |
| 2021/0277839 A1 | 9/2021 | Madden et al. |

(Continued)

FOREIGN PATENT DOCUMENTS

| | | |
|---|---|---|
| CN | 111610793 A | 9/2020 |
| EP | 2 860 375 A1 | 4/2015 |

(Continued)

OTHER PUBLICATIONS

Search Report for GB Application No. 2301420.2 dated Dec. 15, 2023, 2 pages.

(Continued)

*Primary Examiner* — Bao T Nguyen
(74) *Attorney, Agent, or Firm* — Nixon & Vanderhye P.C.

(57) ABSTRACT

A method of contrail suppression. Data is generated with a sensing system onboard a first aircraft during a flight of the first aircraft. The data includes atmospheric information indicative of an atmospheric condition and/or contrail information indicative of a presence or absence of contrails generated by the first aircraft. A second aircraft is operated to perform one or more contrail suppression measures on a basis of the data.

7 Claims, 6 Drawing Sheets

(56) References Cited

U.S. PATENT DOCUMENTS

2022/0223052 A1* 7/2022 Holmes .................... G08G 5/21
2023/0323823 A1* 10/2023 Swann ............... G06Q 10/0631
                                                                                                       60/204

FOREIGN PATENT DOCUMENTS

| EP | 3875741 A1 | 9/2021 |
| EP | 3961012 A1 | 3/2022 |
| WO | 2022/079599 A1 | 4/2022 |

OTHER PUBLICATIONS

Combined Search and Examination Report for GB Application No. 2301420.2 dated Jul. 20, 2023, 6 pages.
European Search Report cited in EP 24152043.6 mailed Jul. 19, 2024, 11 pages.
Lance Sherry et al., "Design Of An Aircraft Induced Cloud (AIC) Abatement Program (AAP) For Global Warming Mitigation", 2021 Integrated Communications Navigation and Surveillance Conference (ICNS), IEEE, Apr. 19, 2021, 10 pages.

\* cited by examiner

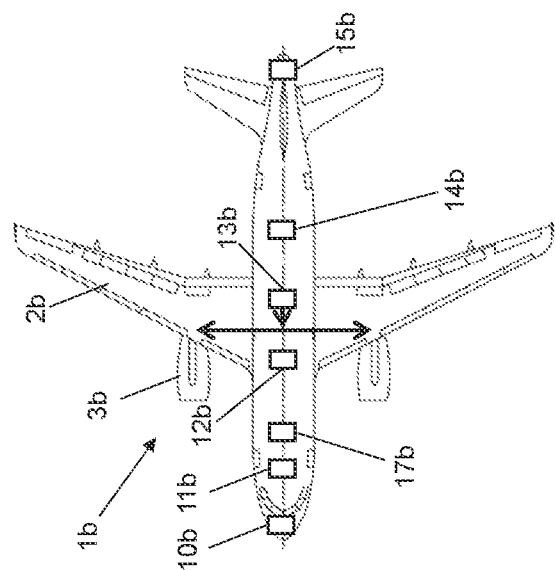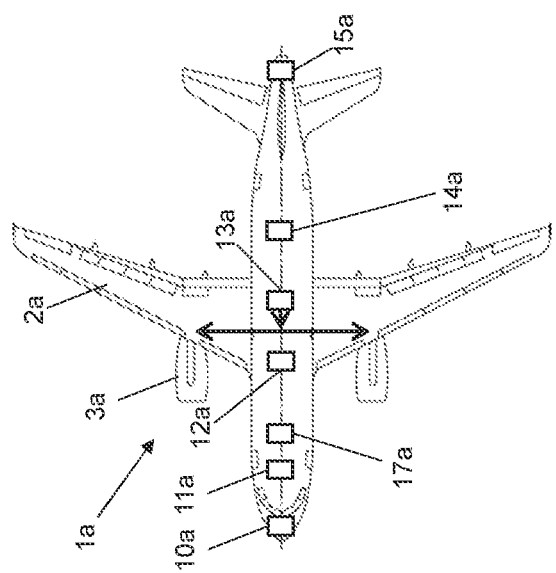
Figure 2

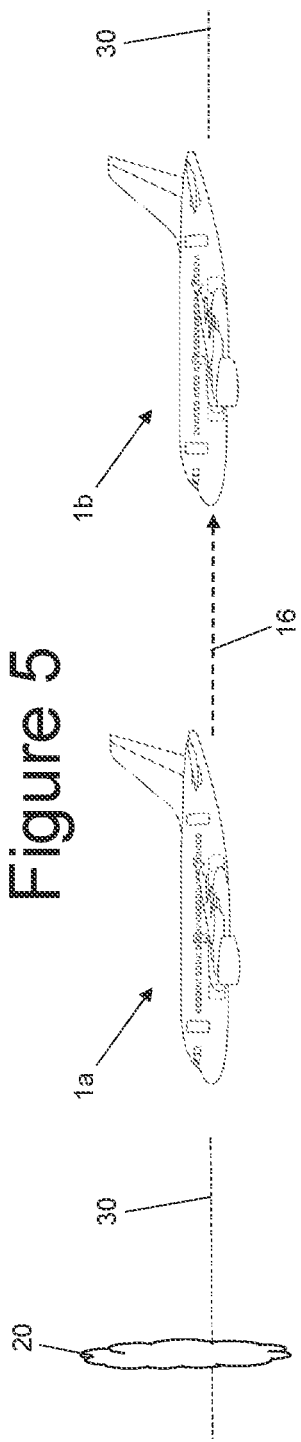
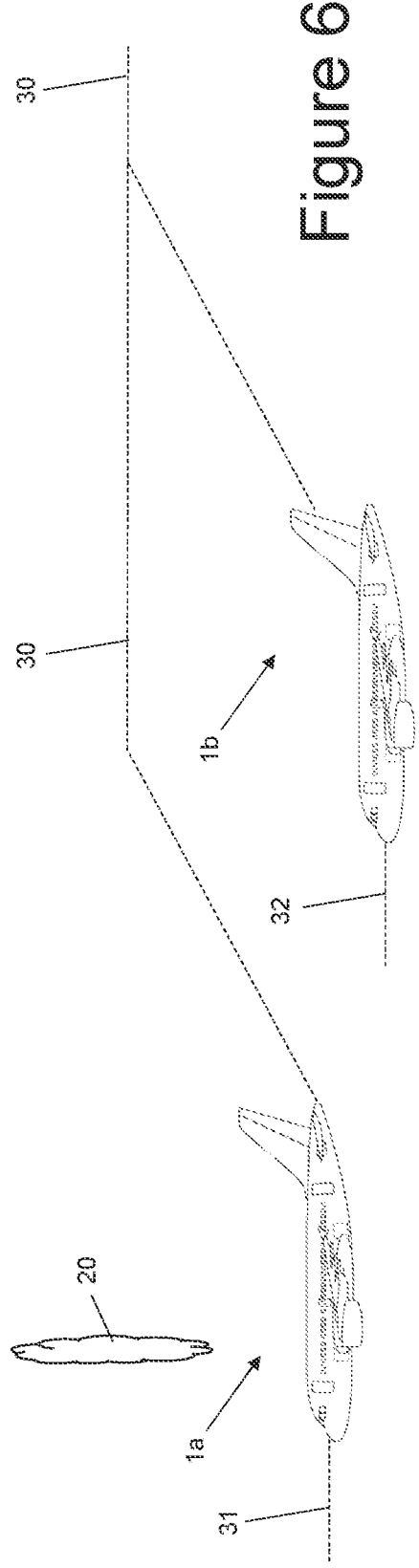

CONTRAIL SUPPRESSION

RELATED APPLICATION

This application incorporates by reference and claims priority to United Kingdom patent application GB 2301420.2, filed Feb. 1, 2023.

FIELD OF THE INVENTION

The present invention relates to an aircraft, a flight planning tool, a method of contrail suppression, a computer-implemented method of calculating a flight route, a method of fueling an aircraft, and a method of loading an aircraft with a contrail suppression fuel-additive.

BACKGROUND OF THE INVENTION

European patent application EP3961012 A1 discloses an aircraft flight contrail assessment device comprising a contrail sensor adapted to produce contrails data representative of an atmosphere parameter having an influence on the formation of contrails or an observation parameter varying depending on at least the presence of one or more contrails, and a processing unit adapted to calculate at least a contrails value representative of an amount of contrail, based on said contrails data. The invention provides such device as well a corresponding method to evaluate the amount of contrails produced by an aircraft during a flight.

SUMMARY OF THE INVENTION

A first aspect of the invention provides a method of contrail suppression, the method comprising: generating data with a sensing system onboard a first aircraft during a flight of the first aircraft, wherein the data comprises atmospheric information indicative of an atmospheric condition and/or contrail information indicative of a presence or absence of contrails generated by the first aircraft; and operating a second aircraft to perform one or more contrail suppression measures on a basis of the data.

Optionally the data is associated with an air space occupied by the first aircraft during the flight of the first aircraft; and the flight of the second aircraft follows a flight route which includes the air space occupied by the first aircraft.

Optionally the method further comprises transmitting the data from the first aircraft during the flight of the first aircraft.

Optionally the method further comprises receiving the data at the second aircraft during the flight of the second aircraft.

Optionally the one or more contrail suppression measures comprise switching a fuel system of the second aircraft to a fuel less prone to cause contrails.

Optionally the one or more contrail suppression measures comprise a flight route for the second aircraft.

A second aspect of the invention provides a computer-implemented method of calculating a flight route, the method comprising: receiving data from a first aircraft during a flight of the first aircraft, wherein the data comprises atmospheric information indicative of an atmospheric condition and/or contrail information indicative of a presence or absence of contrails generated by the first aircraft; and calculating a flight route for a second aircraft on a basis of the data.

Optionally the flight route is calculated by a flight planning tool.

Optionally the flight route is calculated on a basis of external meteorological information, and/or on a basis of satellite observation, and/or on a basis of observations from ground based sensors.

Optionally the method further comprises transmitting the flight route to the second aircraft.

Optionally the flight route is transmitted to the second aircraft on the ground before its flight.

Optionally the flight route includes air space occupied by the first aircraft.

Optionally the flight route is calculated to avoid ice super saturated regions detected by the first aircraft and/or calculated to avoid air space in which contrails have been generated by the first aircraft.

A further aspect of the invention provides a method of operating an aircraft, the method comprising: calculating a flight route by a method according to the second aspect; and operating the aircraft to fly the flight route.

A further aspect of the invention provides a method of fueling an aircraft, the method comprising: calculating a flight route by a method according to the second aspect; calculating a risk of contrail generation for the calculated flight route; calculating a fuel load on a basis of the risk of contrail generation for the flight route; loading the second aircraft with a first fuel; and loading the aircraft with an amount of a second fuel which is less prone to causing contrails than the first fuel, wherein the amount of the second fuel is determined on a basis of the calculated fuel load.

A further aspect of the invention provides a method of loading an aircraft with a contrail suppression fuel-additive, the method comprising: calculating a flight route by a method according to the second aspect; calculating a risk of contrail generation for the calculated flight route; calculating an additive load on a basis of the risk of contrail generation for the flight route; and loading the aircraft with an amount of a contrail suppression fuel-additive, wherein the amount of the contrail suppression fuel-additive is determined on a basis of the additive load.

Optionally the data comprises atmospheric information indicative of an atmospheric condition.

Optionally the data comprises contrail information indicative of a presence or absence of contrails generated by the first aircraft.

Optionally the data comprises atmospheric information indicative of an atmospheric condition and contrail information indicative of a presence or absence of contrails generated by the first aircraft.

Optionally the atmospheric condition comprises a humidity.

Optionally the atmospheric information comprises an indication of an ice super saturated region.

A further aspect of the invention provides an aircraft comprising: a sensing system, wherein the sensing system is configured to generate data, the data comprising atmospheric information indicative of an atmospheric condition and/or contrail information indicative of a presence or absence of contrails generated by the aircraft; and a transmitter configured to transmit the data during flight of the aircraft.

Optionally the data comprises atmospheric information indicative of an atmospheric condition and contrail information indicative of a presence or absence of contrails generated by the first aircraft; and the sensing system comprises an atmospheric sensor configured to generate the atmospheric information and a contrail sensor configured to generate the contrail information.

A further aspect of the invention provides a contrail suppression system comprising: a first aircraft according to the receding aspect; and a second aircraft configured to implement one or more contrail suppression measures on a basis of the data.

Optionally the system further comprises: a flight planning tool configured to calculate a flight route for the second aircraft on a basis of the data, wherein the second aircraft is configured to follow the flight route.

Optionally the flight planning tool is configured to transmit the flight route to the second aircraft.

A further aspect of the invention provides a flight planning tool configured to receive data from a first aircraft, wherein the data comprises atmospheric information indicative of an atmospheric condition and/or contrail information indicative of a presence or absence of contrails generated by the first aircraft, and wherein the flight planning tool is configured to calculate a flight route for a second aircraft on a basis of the data.

Optionally the flight route is calculated to avoid ice super saturated regions detected by the first aircraft and/or calculated to avoid air space in which contrails have been generated by the first aircraft.

Optionally the flight planning tool is configured to calculate a risk of contrail generation for the calculated flight route; and the flight planning tool is further configured to calculate a fuel load for the second aircraft on a basis of the risk of contrail generation for the calculated flight route.

BRIEF DESCRIPTION OF THE DRAWINGS

Embodiments of the invention will now be described with reference to the accompanying drawings, in which:

FIG. 2 shows the aircraft implementing a contrail suppression measure of using a fuel is less prone to cause contrails;

FIG. 5 shows the aircraft flying on a common flight route;

FIG. 6 shows the aircraft implementing a contrail suppression measure of reducing their altitude.

DETAILED DESCRIPTION OF EMBODIMENT(S)

Figure 1:
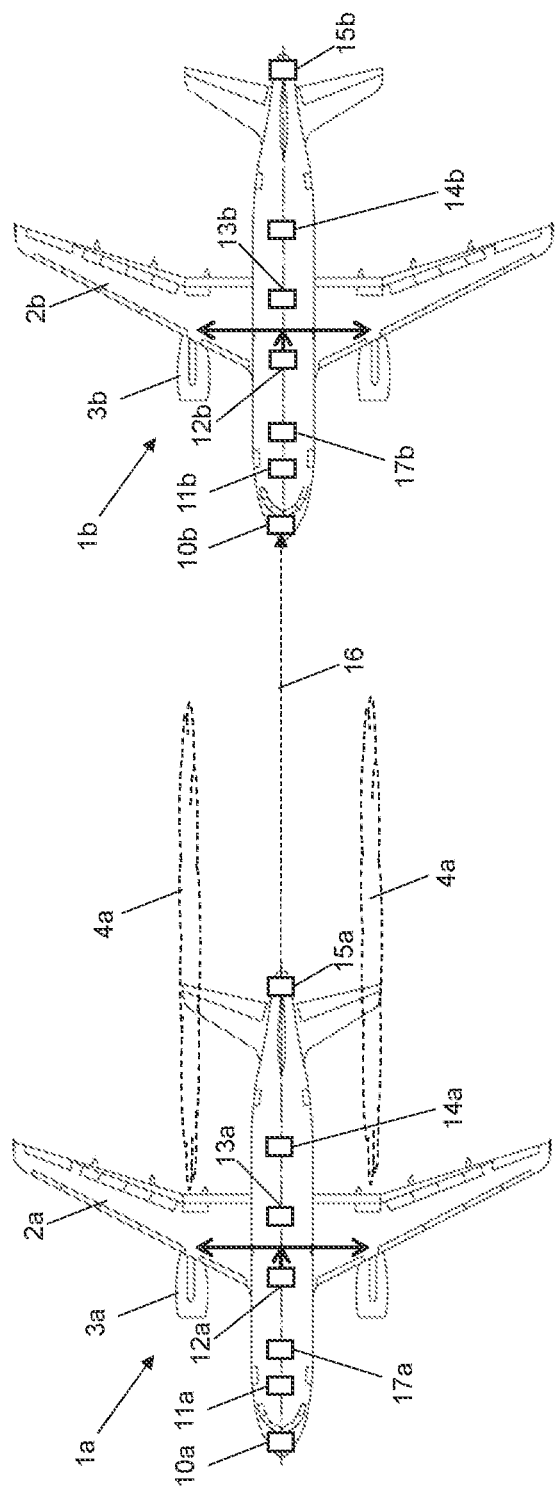
FIG. 1 shows a contrail suppression system comprising a pair of aircraft

FIG. 1 shows a contrail suppression system comprising first and second aircraft 1a,b during flight. The aircraft 1a,b may be flying in close formation, or separated by some distance but with the second (following) aircraft 1b following the first (leading) aircraft 1a along a similar flight route. The aircraft 1a,b are similar, with equivalent parts designated 'a' for the first aircraft 1a, and 'b' for the second aircraft 1b.

Each aircraft comprises a pair of wings 2a,b carrying engines 3a,b. The engines 3a,b are fed with fuel from a fuel system comprising fuel tanks 12a,b and 13a,b. The engines can either be fed with a first fuel from a first fuel tank 12a,b or with second fuel from a second fuel tank 13a,b. At the time of FIG. 1 the engines are being fed with the first fuel from the first fuel tank 12a,b. The fuel tanks are only indicated schematically and can be located in any part of the aircraft.

The first fuel may be a standard fuel, such as JetA1, which is likely to cause condensation trails (referred to herein as "contrails") in certain atmospheric conditions. The second fuel may be Sustainable Aviation Fuel (SAF), or any other fuel which is less prone to causing contrails than the first fuel. SAF is less prone to causing contrails than JetA1 because it produces less soot.

Each aircraft comprises a transmitter 10a,b configured to transmit data from the aircraft during flight of the aircraft, and a receiver 15a,b configured to receive data at the aircraft during flight of the aircraft. These can be located in any part of the aircraft and are shown in the nose and tail in FIG. 1 for ease of illustration. In this example the transmitter and receiver are shown as separate devices, but in other embodiments a single device may be used to provide transmit and receive functions.

Each aircraft comprises an avionics system indicated schematically at 17a,b which controls the fuel tanks 12a,b; 13a,b and also controls the flight route of the aircraft. The avionics system 17a,b may be configured to implement one or more contrail suppression measures during a flight of the aircraft. For instance the avionics system 17a,b can switch the fuel system to the second fuel (which is less prone to cause contrails) and operate flight control devices (rudder, ailerons etc) to control the trajectory of the aircraft to follow a flight route less likely to cause contrails.

Each aircraft also comprises a sensing system comprising a forward-facing atmospheric sensor 11a,b and a rear-facing contrail sensor 14a,b.

The atmospheric sensor 11a,b can be located onboard the aircraft at any position in which it has an unimpeded forward-facing view. The atmospheric sensor 11a,b is configured to generate atmospheric information indicative of an atmospheric condition and feed the atmospheric information to the avionics system 17a,b and the transmitter 15a,b. By way of non-limiting example, the atmospheric condition may comprise a humidity, or any other indication of an ice super saturated region (ISSR) which will tend to cause contrails to be generated.

The contrail sensor 14a,b can be located onboard the aircraft at any position in which it has an unimpeded rear-facing view. The contrail sensor 14a,b is configured to generate contrail information indicative of a presence or absence of contrails generated by the aircraft and feed the contrail information to the avionics system 17a,b and the transmitter 15a,b. By way of non-limiting example, the contrail sensor 14a,b may be a rear-facing camera which takes images of the exhaust plumes of the aircraft and analyses the images to detect the presence or absence of contrails.

Note that each contrail sensor 14a,b is configured to generate contrail information indicative of a presence or absence of contrails generated by the aircraft carrying the sensor. That is, the contrail sensor 14a is configured to generate contrail information indicative of a presence or absence of contrails 4a generated by the first aircraft 1a; and the contrail sensor 14b is configured to generate contrail information indicative of a presence or absence of contrails generated by the second aircraft 1b.

The data from the sensing system 11a, 14a is associated with an air space occupied by the first aircraft 1a during the flight of the first aircraft 1a. Specifically, the atmospheric information is indicative of an atmospheric condition in the air space immediately in front of the first aircraft 1a (hence soon to be occupied by the first aircraft 1*a*) and the contrail information is indicative of a presence or absence of contrails generated by the first aircraft 1*a* in the air space immediately behind the first aircraft 1*a*.

The atmospheric information and contrail information may be recorded onboard the aircraft 1*a,b*.

The flight of the second aircraft 1*b* may follow a flight route which includes the air space occupied by the first aircraft 1*a*.

In a transmission 16 shown in FIG. 1, the atmospheric information and contrail information are transmitted from the transmitter 15*a* of the first aircraft 1*a* during flight of the first aircraft 1*a* and received at the receiver 10*b* of the second aircraft 1*b* during flight of the second aircraft 1*b*.

At the time of FIG. 1, the contrail information in the transmission 16 is indicative of a presence of contrails 4*a* being generated by the first aircraft 1*a*. The detection of the contrails 4*a* causes the avionics system 17*a* of the first aircraft 1*a* to switch its fuel system to the second fuel, by changing from the first fuel tank 12*a* to the second fuel tank 13*a* as shown in FIG. 2. The consequent switch to SAF fuel causes the contrails 4*a* to stop as shown in FIG. 2.

The second aircraft 1*b* also implements one or more contrail suppression measures on a basis of the data received from the first aircraft in the transmission 16. In this example, it causes the avionics system 17*b* of the second aircraft 1*b* to switch from fuel tank 12*b* to fuel tank 13*b* as shown in FIG. 2, so no contrails are generated by the second aircraft 1*b* when it flies into the air space previously occupied by the first aircraft 1*a* at the time of FIG. 1. The switch from fuel tank 12*b* to fuel tank 13*b* may be made immediately, if the aircraft 1*a,b* are flying in close formation, or at a later time when the second aircraft 1*b* enters the airspace where the contrails 4*a* were being generated by the first aircraft.

Figure 3:
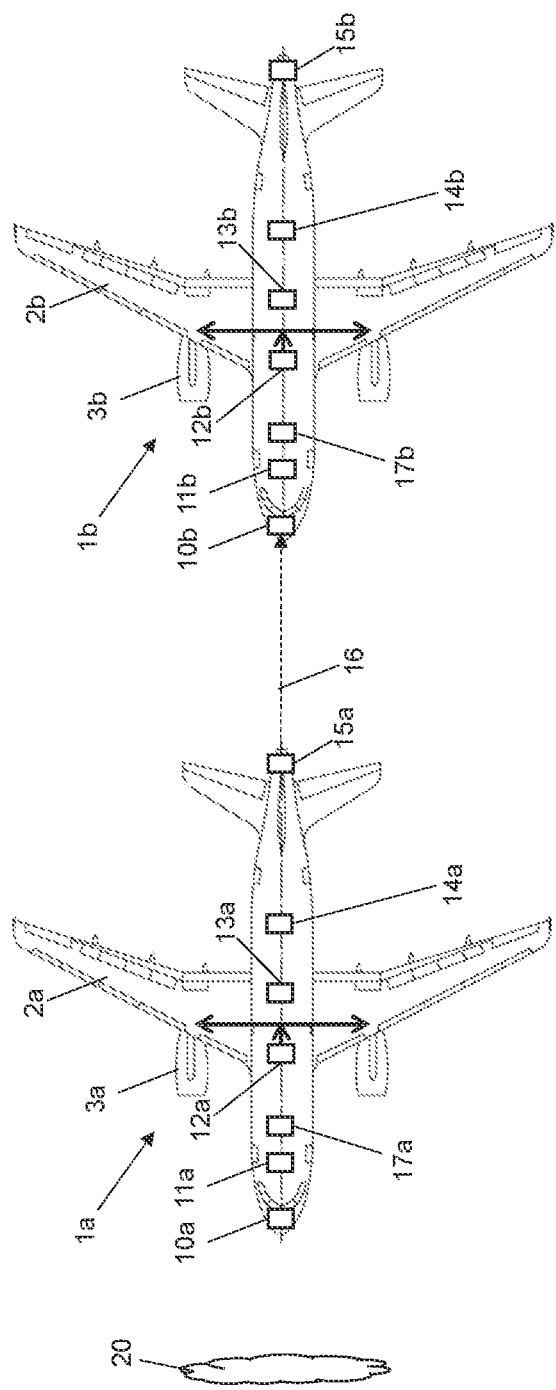
FIG. 3 shows the aircraft of FIG. 1 approaching an ice super saturated region.
Figure 4:
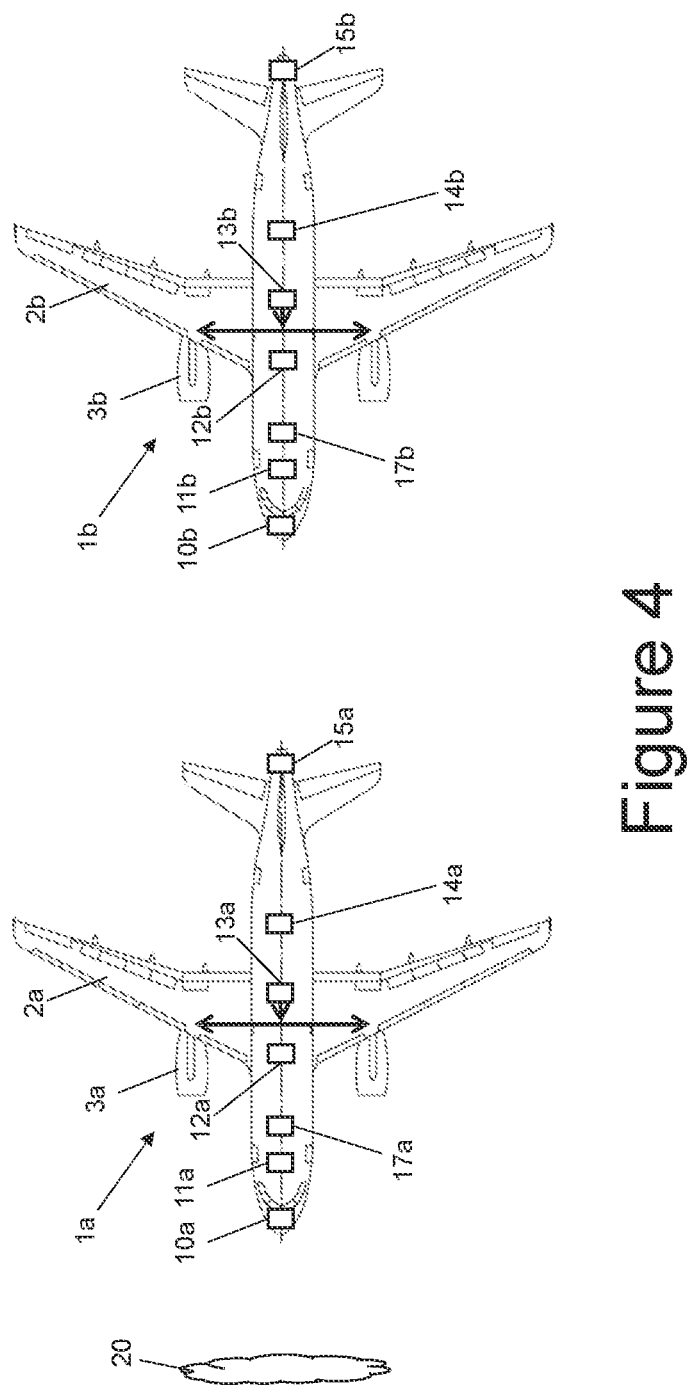
FIG. 4 shows the aircraft implementing a contrail suppression measure of using a fuel is less prone to cause contrails.

At a different time shown in FIG. 3, no contrails are being generated so the contrail information in the transmission 16 is indicative of an absence of contrails 4*a* being generated by the first aircraft 1*a*. However, the first aircraft 1*a* is about to fly into an ice super saturated region (ISSR) 20 which will tend to cause contrails to be generated, and this is indicated by the atmospheric information in the transmission 16. The detection of the ISSR 20 in the atmospheric information causes the avionics system 17*a* of the first aircraft 1*a* to switch from fuel tank 12*a* to fuel tank 13*a* as shown in FIG. 4, which prevents contrails from developing as the first aircraft 1*a* flies into the ISSR 20. The second aircraft 1*b* also implements one or more contrail suppression measures on a basis of the data received from the first aircraft in the transmission 16. In this example it causes the avionics system 17*b* of the second aircraft 1*b* to switch from fuel tank 12*b* to fuel tank 13*b* as shown in FIG. 4, so no contrails are generated by the second aircraft 1*b* when it flies into the ISSR 20. The switch from fuel tank 12*b* to fuel tank 13*b* may be made immediately, if the aircraft 1*a,b* are flying in close formation, or at a later time when the second aircraft 1*b* enters the ISSR 20.

In the case of FIG. 2 and FIG. 4, when the atmospheric information indicates that the first aircraft 1*a* is no longer flying in an ISSR, then the avionics system 17*a* of the first aircraft 1*a* may switch the fuel system back to fuel tank 12*a*. The second aircraft 1*b* may also switch its fuel system back to fuel tank 12*b* on a basis of the atmospheric information from the first aircraft 1*a*.

FIGS. 1-4 show one type of contrail suppression measure (change of fuel type) which can be implemented by the aircraft 1*a,b*. Another type of contrail suppression measure is to feed a contrail suppression fuel-additive into the fuel line from the first fuel tank 12*a,b* without switching from JetA1. Another type of contrail suppression measure (change of flight route) is shown in FIGS. 5 and 6.

In FIG. 5 the aircraft 1*a,b* are following a flight route 30 which is heading into an ISSR 20. The detection of the ISSR 20 causes both aircraft 1*a,b* to implement a contrail suppression measure, which in this case comprises lowering their cruise altitude to revised flight routes 31, 32 which avoid the ISSR 20, thus avoiding the creation of contrails by either aircraft 1*a,b*.

Optionally the avionics system 17*a* of the first aircraft is configured to calculate the revised flight route 31 for the first aircraft 1*a* on a basis of the atmospheric information; and/or the avionics system 17*a* of the first aircraft is configured to calculate the revised flight route 32 for the second aircraft 1*b* on a basis of the atmospheric information.

In the examples above, a contrail suppression system is provided comprising a sensing system 11*a*, 14*a* onboard a first aircraft 1*a*; and a second aircraft 1*b* configured to implement one or more contrail suppression measures on a basis of the data. In the methods described, a sensing system is provided onboard each aircraft 1*a,b* but only the sensing system of the first aircraft 1*a* is used. In an alternative embodiment, only the first aircraft 1*a* may have such a sensing system.

The examples above enable contrails to be suppressed in real time by direct aircraft-to-aircraft communication during simultaneous flights of two aircraft. The two aircraft may be flying in a coordinated fashion in close formation, or separated by some distance (i.e. not flying in a coordinated fashion or in close formation). Both aircraft are in flight in FIGS. 1-6, but in an alternative embodiment the second aircraft 1*b* may be on the ground when it receives the data from the first aircraft 1*a*.

Figure 7:
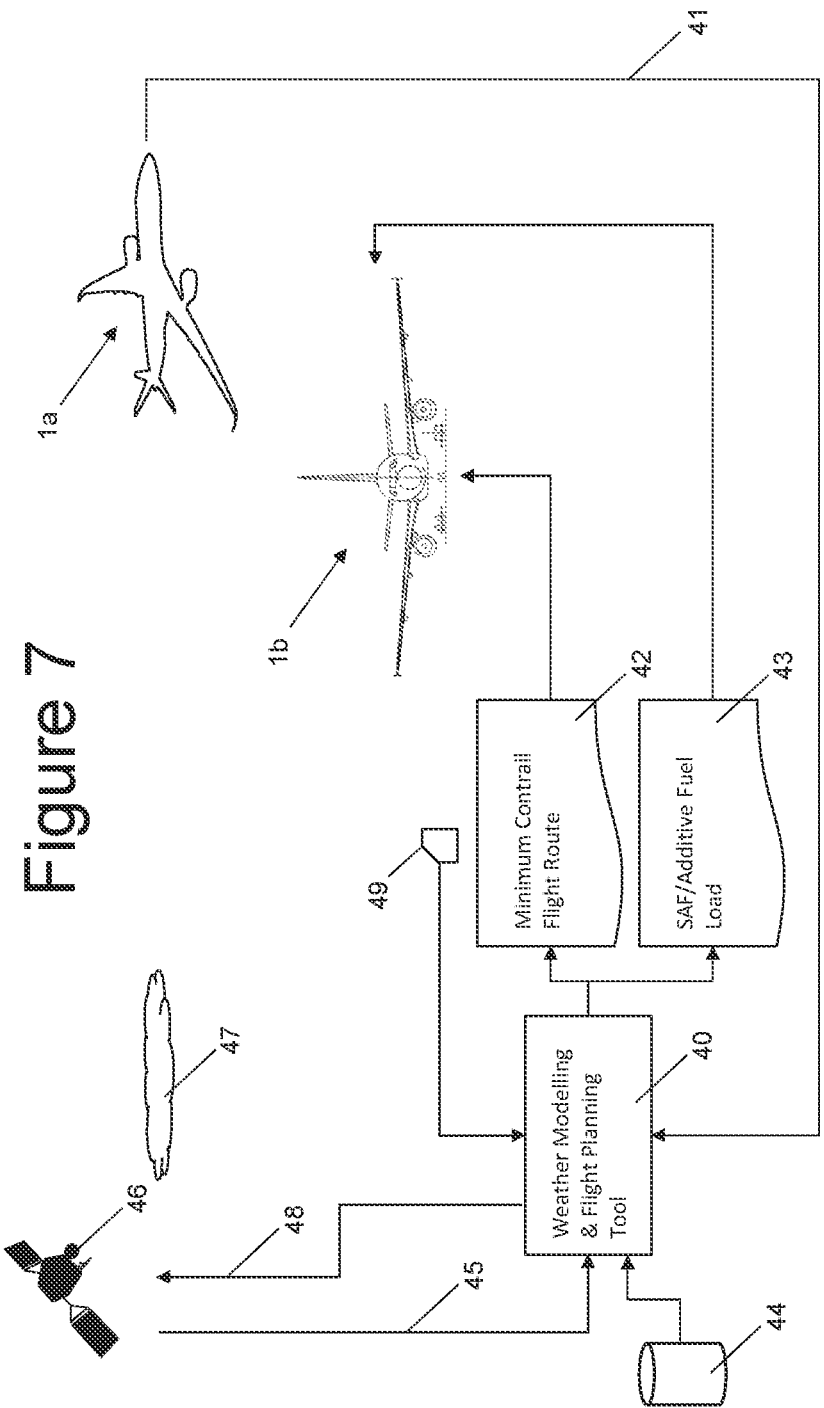
FIG. 7 shows a system for generating a flight route.

The alternative example of FIG. 7 provides a system for generating a flight route before a flight of the second aircraft 1*b*, which reduces the generation of contrails during the flight of the second aircraft 1*b*.

The system of FIG. 7 comprises a computer-implemented ground-based flight planning tool 40 configured to receive atmospheric information and contrail information from the first aircraft 1*a* via a transmission 41, which may optionally be transmitted via a satellite or other intermediaries. The transmission 41 may be received continuously or intermittently during flight of the first aircraft 1*a*. As in the previous embodiments, the data in the transmission 41 comprises atmospheric information indicative of an atmospheric condition and/or contrail information indicative of a presence or absence of contrails generated by the first aircraft 1*a*.

The flight planning tool 40 is configured to calculate a minimum contrail flight route 42 for the second aircraft 1*b* on a basis of the data from the first aircraft 1*a*.

The minimum contrail flight route 42 comprises a flight route for the second aircraft 1*b* designed by the flight planning tool 40 with minimal risk of contrail generation, by avoiding ISSRs detected by other aircraft (such as the first aircraft 1*a*); and/or by avoiding air space in which contrails have recently been generated by other aircraft (such as the first aircraft 1*a*).

Optionally the flight planning tool 40 is also configured to calculate a risk of contrail generation for the minimum contrail flight route 42; and calculate an SAF/additive load 43 for the second aircraft 1*b* on a basis of the risk of contrail generation for the minimum contrail flight route 42.

The SAF/additive load 43 may indicate the volume or mass of SAF fuel which must be loaded into the fuel tank 13*b* of the second aircraft 1*b*, to ensure that it contains sufficient SAF fuel to suppress contrail generation to the extent expected as the second aircraft 1b flies the minimum contrail flight route 42. Hence if the minimum contrail flight route 42 has a high risk of contrail generation, then a higher volume of SAF fuel may be required compared to a minimum contrail flight route 42 with a low risk of contrail generation.

Prior to the second aircraft's next flight, its first fuel tank 12b is loaded with a first fuel (for instance JetA1) and its second fuel tank 13b is loaded with an amount of a second fuel (for instance SAF) less prone to causing contrails than the first fuel. The amount of the second fuel loaded into the second fuel tank 13b is determined on a basis of the SAF/additive load 43 calculated by the flight planning tool 40.

Alternatively the SAF/additive load 43 may indicate the volume or mass of contrail suppression fuel-additive which must be loaded onto second aircraft 1b, to ensure that it contains sufficient contrail suppression fuel-additive to suppress contrail generation to the extent expected as the second aircraft 1b flies the minimum contrail flight route 42. Hence if the minimum contrail flight route 42 has a high risk of contrail generation, then a higher volume of contrail suppression fuel-additive may be required compared to a minimum contrail flight route 42 with a low risk of contrail generation.

Prior to the second aircraft's next flight, it is loaded with an amount of contrail suppression fuel-additive. In this case the amount of the contrail suppression fuel-additive loaded onto the second aircraft 1b is determined on a basis of the SAF/additive load 43 calculated by the flight planning tool 40.

The minimum contrail flight route 42 and the SAF/additive load 43 may be calculated by the flight planning tool 40 on a basis of not only the data in the transmission 41 from the first aircraft 1a, but also other data such as: external meteorological information from a geospatial meteorological database 44, and/or satellite observations 45 from a satellite 46 (the satellite observations indicating the presence or absence of ISSRs 47), and/or observations from ground based sensors 49.

Optionally the satellite 46 may be updated by the flight planning tool 40 via a transmission 48 to update new ISSR acquisitions by the satellite 46.

In this example the minimum contrail flight route 42 and the SAF/additive load 43 are transmitted to the second aircraft 1b on the ground before its flight. Optionally the minimum contrail flight route 42 may instead be transmitted to the second aircraft 1b during flight of the second aircraft 1b.

The minimum contrail flight route 42 is stored on the second aircraft 1b, and the second aircraft 1b is then operated to fly the minimum contrail flight route 42.

In summary, various methods of contrail suppression are disclosed in FIGS. 1-7. The methods comprise: generating data with a sensing system 11a, 14a onboard a first aircraft 1a during a flight of the first aircraft, wherein the data comprises atmospheric information indicative of an atmospheric condition and/or contrail information indicative of a presence or absence of contrails generated by the first aircraft; and operating a second aircraft 1b to perform one or more contrail suppression measures on a basis of the data. The contrail suppression measure may comprise a flight route (as in FIG. 6), a switch of fuel composition (as in FIGS. 2 and 4), the use of a contrail suppression additive, or any other measure which has the effect of reducing the generation of contrails by the second aircraft 1b.

Typically the data is transmitted from the first aircraft 1a during the flight of the first aircraft 1a, although optionally it may be obtained from the first aircraft 1a after the flight of the first aircraft 1a.

Methods of calculating a flight route are also disclosed. The methods comprise: receiving data from a first aircraft 1a during a flight of the first aircraft, wherein the data comprises atmospheric information indicative of an atmospheric condition and/or contrail information indicative of a presence or absence of contrails generated by the first aircraft 1a; and calculating a flight route for a second aircraft 1b on a basis of the data. The flight route may be calculated before flight of the second aircraft 1b by a ground-based flight planning tool 40 as shown in FIG. 7, or it may be calculated in real time during flight of the second aircraft 1b by a computer-implemented flight planning tool onboard the second aircraft 1b.

Also disclosed is a computer-implemented flight planning tool configured to receive data from a first aircraft 1a. The data comprises atmospheric information indicative of an atmospheric condition and/or contrail information indicative of a presence or absence of contrails generated by the first aircraft 1a. The flight planning tool 40 is configured to calculate a flight route for a second aircraft 1b on a basis of the data. The flight planning tool may be a ground-based tool 40 as in FIG. 7, or a tool hosted onboard the second aircraft 1b.

Also disclosed is an aircraft 1a comprising a sensing system 11a, 14a. The sensing system is configured to generate data, the data comprising atmospheric information indicative of an atmospheric condition and/or contrail information indicative of a presence or absence of contrails generated by the aircraft 1a. A transmitter 15a is configured to transmit the data during flight of the aircraft 1a, either via a direct aircraft-to-aircraft transmission 16 as in FIG. 1, or via a transmission 41 to a ground-based flight planning tool 40 as in FIG. 7. The provision of a transmitter 15a enables the data to be used not only to trigger the implementation of one or more contrail suppression measures for the first aircraft 1a, but also to trigger the implementation of one or more contrail suppression measures for a second aircraft 1b.

Where the word 'or' appears this is to be construed to mean 'and/or' such that items referred to are not necessarily mutually exclusive and may be used in any appropriate combination.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of fueling a second aircraft, the method comprising:
   receiving data from a first aircraft during a flight of the first aircraft, wherein the data comprises atmospheric information indicative of an atmospheric condition and/or contrail information indicative of a presence or absence of contrails generated by the first aircraft;

calculating a flight route for the second aircraft using the data;

calculating a risk of contrail generation by the second aircraft for the calculated flight route;

calculating a fuel load on a basis of the risk of contrail generation;

loading the second aircraft with a first fuel; and loading the second aircraft with an amount of a second fuel which is less prone to causing contrails than the first fuel, wherein the amount of the second fuel is determined on a basis of the calculated fuel load.

2. The method according to claim 1, wherein the data is associated with an air space occupied by the first aircraft during the flight of the first aircraft; and the flight route includes an air space occupied by the first aircraft during the flight of the first aircraft.

3. The method according to claim 1, further comprising transmitting the data from the first aircraft during the flight of the first aircraft.

4. A method of loading a second aircraft with a contrail suppression fuel-additive, the method comprising:

receiving data from a first aircraft during a flight of the first aircraft, wherein the data comprises atmospheric information indicative of an atmospheric condition and/or contrail information indicative of a presence or absence of contrails generated by the first aircraft;

calculating a flight route for the second aircraft on a basis of the data;

calculating a risk of contrail generation by the second aircraft for the flight route;

calculating an additive load on a basis of the risk of contrail generation; and loading the second aircraft an amount of a contrail suppression fuel-additive, wherein the amount of the contrail suppression fuel-additive is determined based on the additive load.

5. The method according to claim 4, wherein the data is associated with an air space occupied by the first aircraft during the flight of the first aircraft; and the flight route of the second aircraft includes the air space occupied by the first aircraft.

6. The method according to claim 4, further comprising transmitting the data from the first aircraft during the flight of the first aircraft.

7. The method according to claim 4, further comprising receiving the data at the second aircraft during the flight of the second aircraft.

* * * * *